United States Patent

[11] 3,624,625

| | | | |
|---|---|---|---|
| [72] | Inventor | Stephen P. Stonestreet Flint, Mich. | |
| [21] | Appl. No. | 839,574 | |
| [22] | Filed | July 7, 1969 | |
| [45] | Patented | Nov. 30, 1971 | |
| [73] | Assignee | General Motors Corporation Detroit, Mich. | |

[54] GAUGE WITH A SOLID STATE DRIVE
16 Claims, 7 Drawing Figs.

[52] U.S. Cl. .................................................... 340/177 R, 324/144
[51] Int. Cl. ...................................................... G08c 19/04
[50] Field of Search ........................................... 340/177 R; 324/144

[56] References Cited

UNITED STATES PATENTS 3,302,191  1/1967  Ziegler .......................... 340/177

*Primary Examiner*—John W. Caldwell
*Assistant Examiner*—Michael Slobasky
*Attorneys*—Jean L. Carpenter and Paul Fitzpatrick ABSTRACT: A gauge circuit for producing an angularly displaceable magnetic field that is the vector sum of magnetic fields produced by a first winding that is continuously energized and by second, third, fourth and fifth windings that are variably energized in accordance with a voltage generated by a sender unit, first and second transistors of opposite conductivity types controlling the energization of the variably energized windings.

PATENTED NOV 30 1971 3,624,625

INVENTOR.
Stephen P. Stonestreet
BY
Paul Fitzpatrick
ATTORNEY

GAUGE WITH A SOLID STATE DRIVE

This invention relates to electrical gauges and, more particularly, to an improved circuit for use in gauges wherein an angularly displaceable magnetic field is employed to control the alignment of an indicator needle.

Electromagnetic gauges of various types are in common use in a variety of applications where it is necessary to continuously monitor a condition at a remote station. A familiar example of such a gauge is the well known automobile fuel gauge. These gauges commonly employ a sender unit located at the remote station for generating a signal proportional to the condition being monitored and a receiver, or indicator, unit conveniently mounted on an instrument panel to indicate to an operator the status of the condition being monitored. Generally speaking, the indicator unit includes a number of windings for producing a similar number of magnetic fields that combine so as to produce a resultant magnetic field that varies both in its magnitude and direction in accordance with the energization of the respective windings. The indicator unit generally also includes a permanent magnet armature positioned within the resultant magnetic field for detecting the orientation of the resultant magnetic field by aligning itself with the resultant magnetic field. An indicator needle is usually affixed to the permanent magnet armature for indicating to an observer the orientation of the resultant magnetic field, thereby indicating the status of the condition being monitored. While many gauges of the variety described provide an indicator needle travel which is limited to angles less than 90°, it is desirable in most applications to provide a greater indicator needle travel to facilitate ease in accurately reading the indicated quantity. However, gauges which provide a greater indicator needle travel have in general been so complex and expensive to manufacture that their cost has usually been prohibitive.

According to the present invention, an indicator needle travel of 270° is obtainable from an indicator unit employing five windings, one of which produces a continuous magnetic field and four of which produce magnetic fields of variable magnitude in accordance with a voltage generated by a sender unit so as to produce an angularly displaceable magnetic field that is the vector sum of the magnetic fields produced by the five windings.

The invention may be best understood by reference to the following description of a specific embodiment of the invention and the accompanying drawing, in which.

Figure 1:
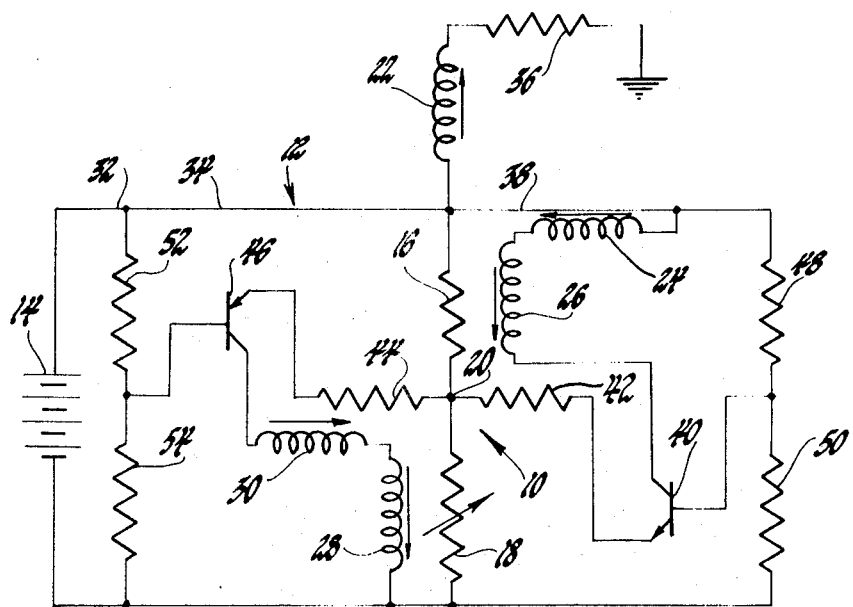
FIG. 1 is a schematic diagram of the circuit of the specific embodiment.

Referring now to FIG. 1, the circuit is shown to include a sender unit 10 for generating a voltage proportional to the condition being monitored and an indicator unit 12 for receiving the voltage generated by the sender unit 10 and for indicating this voltage to an observer. Both the sender unit 10 and the indicator unit 12 are energized by a common power source, disclosed as a battery 14.

The sender unit 10 in the illustrated embodiment is comprised of a resistor 16 series connected with a rheostat 18 to form a voltage divider. In using the circuit in the aforementioned application of a fuel gauge, the rheostat 18 resistance is varied in accordance with the fuel level in a fuel reservoir (not shown), as by using a well known float linkage (not shown), so as to vary the voltage at a junction 20 between the resistor 16 and the rheostat 18. As persons skilled in the art will appreciate, only the rheostat 18 needs to be located at the fuel reservoir as the resistor 16 may be located adjacent the indicator unit 12. Locating the resistor 16 in this fashion achieves the practical advantage that only a single energized lead need extend from the indicator unit 12, which may be on a vehicle instrument panel (not shown), to the fuel reservoir, which may be several feet from the instrument panel.

The indicator unit 12 is comprised of first, second, third, fourth, and fifth windings 22, 24, 26, 28 and 30, which produce corresponding first, second, third, fourth and fifth magnetic fields $F_1$, $F_2$, $F_3$, $F_4$, and $F_5$ along their respective axes when energized. The intensity of the respective magnetic fields $F_1$, $F_2$, $F_3$, $F_4$ and $F_5$ is dependent upon both the structure and the energization of the respective windings according to the well-known principle that magnetic field intensity is proportional to the number of winding turns and the current therethrough. The first winding 22 is continuously energized and the second, third, fourth and fifth windings are variably energized so as to alternately energize either the second and third windings 24 and 26 or the fourth and fifth windings 28 and 30. By combining the magnetic fields $F_1$, $F_2$, $F_3$, $F_4$ and $F_5$ an angularly displaceable magnetic field R is produced in the indicator unit 12.

For discussion purposes, it is convenient to assume that the axes of the windings 22, 24, 26, 28 and 30 lie within the plane described by the drawing and that the magnetic fields $F_1$, $F_2$, $F_3$, $F_4$ and $F_5$ are directed in the same direction in which current appears to pass through the respective windings 22, 24, 26, 28 and 30, as designated by arrows in the drawing, the directions in the drawing being designated the same as they would appear on a map.

The first winding 22 is continuously energized by the battery 14 through a lead 32, a lead 34, and a resistor 36 so as to produce the constant magnetic field $F_1$ in the upward, or north, direction of the drawing. In the alternative, the constant magnetic field $F_1$ may be produced by other magnetic field producing means, such as a permanent magnet.

The second and third windings 24 and 26 are series connected and energized by the battery 14 through the lead 32, the lead 34, the lead 38, a first transistor 40, a first emitter resistor 42, and the rheostat 18. The second winding 24 thus produces the variable magnetic field $F_2$ directed to the left, or west, direction of the drawing and the third winding 26 produces the variable magnetic field $F_3$ in the downward, or south, direction of the drawing when the respective windings 24 and 26 are energized.

The fourth and fifth windings 28 and 30 are series connected and energized by the battery 14 through the lead 32, the lead 34, the resistor 16, a second emitter resistor 44, and a second transistor 46. The fourth winding 28 is thus energized so as to produce the variable magnetic field $F_4$ in the south direction of the drawing and the fifth winding 30 is energized so as to produce the variable magnetic field $F_5$ directed to the right, or east, direction of the drawing.

The indicator unit 12 also includes a plurality of resistors 48, 50, 52 and 54 for establishing the respective base biases of the transistors 40 and 46. The base biases of the transistors 40 and 46 are selected so as to fully turn off the first transistor 40 in response to the same conditions that begin to turn on the second transistor 46, as will subsequently be described.

As persons skilled in the art will appreciate, other types of voltage responsive switches may be used in place of the transistors 40 and 46 to variably energize the second, third, fourth, and fifth windings 24, 26, 28, and 30. The illustrated use of opposite conductivity-type transistors, one an NPN-device and the other a PNP-device, is merely one method of practicing this invention and other considerations, such as economics, must be weighed in determining the optimum method for a given application.

Figure 2:
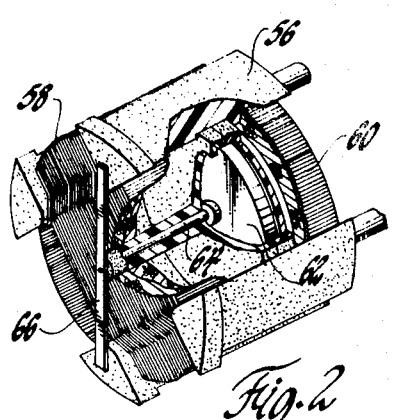
FIG. 2 is an isometric view, partly in section, of a preferred construction for an indicator unit.

A description of a preferred construction for the indicator unit 12 will facilitate a clear understanding of the circuit shown in FIG. 1. In FIG. 2 there is disclosed a gauge body 56, which is utilized as a winding support member for the windings 22, 24, 26, 28 and 30 and which is constructed of a suitable nonmagnetic material such as plastic. The first, third, and fourth windings 22, 26, and 28 are coaxially wound on the gauge body 56 in the form of a first coil 58 and the second and fifth windings 24 and 30 are coaxially wound on the gauge body 56 in the form of a second coil 60. The coils 58 and 60 are wound on the gauge body 56 so as to have their axes intersect at an angle of substantially 90° and to have their respective windings substantially coaxial. The windings 22, 24, 26, 28 and 30 are thus positioned so as to produce the resultant magnetic field R that is the vector sum of the magnetic fields $F_1$, $F_2$, $F_3$, $F_4$ and $F_5$ produced by the windings 22, 24, 26, 28 and 30.

A permanent magnet armature 62 in the form of a flat, round disk which is diametrically magnetized is positioned at the intersection of the axes of the coils 58 and 60 so as to be under the joint influence of the magnetic fields $F_1$, $F_2$, $F_3$, $F_4$ and $F_5$ which align the permanent magnet armature 60 with the resultant magnetic field R. The permanent magnet armature 62 is rotatably supported by means of a shaft 64 extending through the center of the permanent magnet armature 62 and normal thereto. The shaft 64 is supported by the gauge body 56 as to protrude beyond the coils 58 and 60. An indicator needle 66 for indicating the angular displacement of the resultant magnetic field R is mounted on the end of the shaft 64 which protrudes beyond the coils 58 and 60. As persons skilled in the art will appreciate, the gauge body 56 may be filled with a damping substance to improve the operation of the gauge and may be enclosed by a conventional gauge housing (not shown). The housing may be provided with a scale having indicia printed thereon positioned between the indicator needle 66 and the gauge body 56 to facilitate calibration of the indicator needle 66 readings.

The operation of the apparatus shown in FIGS. 1 and 2 will now be described with reference to the flux vector diagrams presented in FIGS. 3 through 7. For descriptive purposes it is convenient to again assume that the rheostat 18 resistance is controlled by a float in accordance with the fuel level in a fuel reservoir and that the rheostat 18 resistance increases with an increase in the amount of fuel present in the fuel reservoir. It is also convenient to assume that the indicator needle 66 is rotated counterclockwise to indicate that the fuel reservoir is empty and is rotated clockwise to indicate that the fuel reservoir is full. While this description is directed toward the effect filling the fuel reservoir has on the circuit of FIG. 1, persons skilled in the art will appreciate that the reverse effect will take place as the fuel reservoir is emptied.

When the rheostat 18 resistance is at a minimum the junction 20 voltage is near ground voltage due to the voltage divider action between the resistor 16 and the rheostat 18. The low voltage of the junction 20 is supplied to the emitters of the transistors 40 and 46 through the respective emitter resistors 42 and 44, which establish the current level through the transistors 40 and 46 under given bias conditions. The resistors 48 and 50 are selected so as to establish the base bias of the transistor 40 at a level above the transistor 40 emitter voltage when the junction 20 is near ground voltage, turning on the transistor 40 and energizing the second and third windings 24 and 26 when the junction 20 is near ground voltage. The transistor 46 is turned off at this time due to the resistors 52 and 54 being selected so as to establish the base bias of the transistor 46 at a level above the transistor 46 emitter voltage when the junction 20 is near ground voltage, turning the transistor 46 off. The transistor 46 thus keeps the windings 28 and 30 deenergized when the junction 20 is near ground voltage. The vector diagram shown in FIG. 3 illustrates the orientation of the resultant magnetic field R under these conditions.

Figure 3:
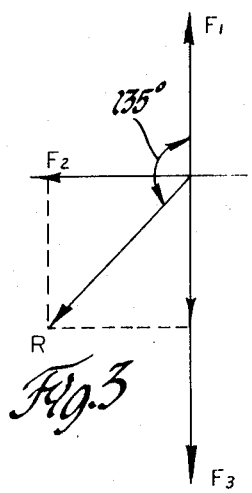

In FIG. 3, as in FIGS. 4 through 7, a set of flux vectors having the same designations as the corresponding magnetic fields $F_1$, $F_2$, $F_3$, $F_4$, $F_5$, and R illustrate the magnitude and direction of the respective magnetic fields. While the magnetic fields $F_1$, $F_2$, $F_3$, $F_4$, $F_5$, and R have discrete values in practice, depending upon the circuitry employed, only their relative magnitudes are of concern. For this reason, only relative vector lengths necessary to produce 270° travel of the indicator needle 66 are described. In FIG. 3 the vector $F_1$ has a unit length and is pointed in the north direction, the vector $F_2$ has a unit length and is pointed in the west direction, the vector $F_3$ has a length of two units and is pointed in the south direction, and the vector R is the vector sum of the vectors $F_1$, $F_2$, and $F_3$.

The vector R in FIG. 3 is pointed in a southwestern direction. Since the indicator needle 66 is aligned with the vector R, it too is pointed in the southwestern direction, which direction indicates that the fuel reservoir is empty.

Figure 4:
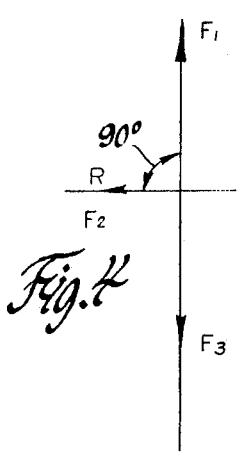

As the quantity of the fuel in the fuel reservoir increases the fuel level rises and the rheostat 18 resistance is increased so as to increase the junction 20 voltage. Increasing the junction 20 voltage reduces the base-emitter voltage of the transistor 40 so as to reduce the conductivity of the transistor 40, decreasing the energization of the second and third windings 24 and 26 so as to decrease the intensity of the second and third magnetic fields $F_2$ and $F_3$. When the current through the second and third windings 24 and 26 is one-half the current therethrough when the junction 20 is at ground potential the vectors $F_1$ and $F_3$ cancel each other and the vector R equals the vector $F_2$ and is pointed in the west direction, as shown in FIG. 4.

Figure 5:
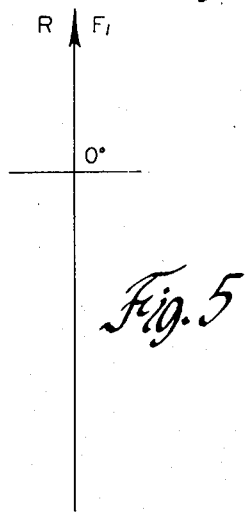

As the quantity of fuel in the fuel reservoir and the resistance of the rheostat 18 continue to increase the junction 20 voltage increases further so as to further decrease the conductivity of the transistor 40. When the junction 20 voltage closely approximates the base bias of the transistor 40 the transistor 40 is turned off and, by controlling the biases of the transistors 40 and 46, the transistor 46 begins to turn on. Since the first winding 22 is the only energized winding at this time, the vector R equals the vector $F_1$ and is pointed in the north direction, as is shown in FIG. 5. The indicator needle 66 also is pointed in the north direction, which direction indicates that the fuel reservoir is half-full.

Figure 6:
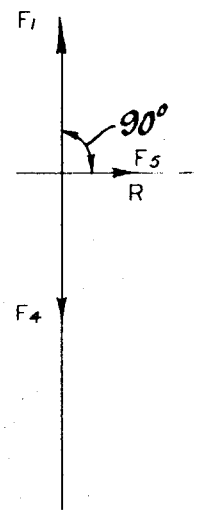
FIGS. 3 through 7 are flux vector diagrams illustrating the operation of the specific embodiment.

A further increase in the quantity of fuel in the reservoir increases the voltage at the junction 20 further, increasing the transistor 40 emitter voltage so as to keep the transistor 40 turned off. However, as the junction 20 voltage increases beyond the transistor 46 base voltage established by the resistors 52 and 54 the transistor 46 is turned on so as to energize the fourth and fifth windings 28 and 30. When the current through the fourth and fifth windings 28 and 30 is such that the vector $F_4$ cancels the first vector $F_1$ the resultant vector R equals the fifth vector $F_5$ and is pointed in the east direction, as shown in FIG. 6.

Figure 7:
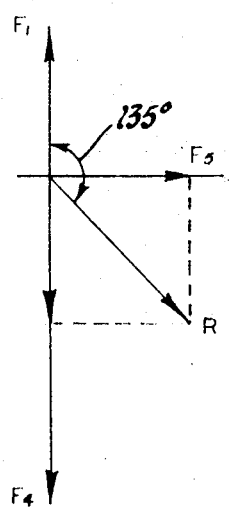

A continued increase in the quantity of fuel in the fuel reservoir and in the junction 20 voltage causes a continued increase in current through the fourth and fifth windings 28 and 30 until, when the fuel reservoir is full and the fourth magnetic field $F_4$ is twice as strong as the first magnetic field $F_1$, the vector R is pointed in the southeast direction, as is shown in FIG. 7. The indicator needle 66 is also pointed in the southeast direction, which direction indicates that the fuel reservoir is full.

It is thus apparent that an indicator needle travel angle of 270° is readily provided by the circuitry described herein. It is equally apparent that the winding configuration described is but one embodiment of this invention and that other winding configurations using a greater or lesser number of windings will be apparent to those skilled in the art. For example, a winding configuration in which the third and fourth windings 26 and 28 are deleted may be employed in the circuitry shown in FIG. 1. By positioning the remaining first, second, and fifth windings 22, 24, and 30 so their respective axes are at other predetermined angles, such as 120°, to each other an indicator needle travel in excess of 180° can readily be obtained from the constant intensity magnetic field $F_1$ produced by the first winding 22 combining with the variable intensity magnetic fields $F_2$ and $F_5$ produced by the second and fifth windings 24 and 30. Configurations such as this, and various other modifications, may be made without departing from the spirit of this invention, which is defined in the appended claims.

What is claimed is:

1. In an indicator gauge, apparatus for producing an angularly displaceable magnetic field comprising sender means for generating a voltage proportional to a condition being monitored, a power source, a first winding energized by the power source so as to produce a first magnetic field of substantially constant magnitude along the axis of the first winding, second, third, fourth, and fifth windings energized by the power source so as to produce second, third, fourth, and fifth magnetic fields along their respective axes, the angularly displaceable magnetic field being the vector sum of the first, second, third, fourth, and fifth magnetic fields, the second winding being series wound with the third winding and the fourth winding being series wound with the fifth winding, the axes of the first, second, third, fourth, and fifth windings substantially describing a plane in which the axes of the first, third, and fourth windings are substantially parallel and positioned so as to cause the first magnetic field to oppose the third and fourth magnetic fields and in which the axes of the second and fifth windings are substantially parallel and positioned so as to cause the second magnetic field to oppose the fifth magnetic field when the respective windings are energized, the axis of the first, third, and fourth windings being at a predetermined angle to the axes of the second and fifth windings, a first voltage responsive switch for controlling the energization of the second and third windings in accordance with the voltage generated by the sender means so as to variably energize the second and third windings when the voltage generated by the sender means is below a certain level and to deenergize the second and third windings when the voltage generated by the sender means is above the certain level, and a second voltage responsive switch for controlling the energization of the fourth and fifth windings in accordance with the voltage generated by the sender means so as to variably energize the fourth and fifth windings when the voltage generated by the sender means is above the certain level and to deenergize the fourth and fifth windings when the voltage generated by the sender means is below the certain level.

2. The apparatus of claim 1 in which the predetermined angle is substantially 90°.

3. In an indicator gauge, apparatus for producing an angularly displaceable magnetic field comprising sender means for generating a voltage proportional to a condition being monitored, a power source, a first winding energized by the power source so as to produce a first magnetic field of substantially constant magnitude along the axis of the first winding, second, third, fourth, and fifth windings energized by the power source so as to produce second, third, fourth, and fifth magnetic fields along their respective axes, the angularly displaceable magnetic field being the vector sum of the first, second, third, fourth, and fifth magnetic fields, the second winding being series wound with the third winding and the fourth winding being series wound with the fifth winding, the axes of the first, second, third, fourth, and fifth windings substantially describing a plane in which the axes of the first, third and fourth windings are substantially parallel and positioned so as to cause the first magnetic field to oppose the third and fourth magnetic fields and in which the axes of the second and fifth windings are substantially parallel and positioned so as to cause the second magnetic field to oppose the fifth magnetic field when the respective windings are energized, the axes of the first, third, and fourth windings being at a predetermined angle to the axes of the second and fifth windings, a first transistor for controlling the energization of the second and third windings in accordance with the voltage generated by the sender means so as to variably energize the second and third windings when the voltage generated by the sender means is below a certain level and to deenergize the second and third windings when the voltage generated by the sender means is above the certain level, and a second transistor for controlling the energization of the fourth and fifth windings in accordance with the voltage generated by the sender means so as to variably energize the fourth and fifth windings when the voltage generated by the sender means is above the certain level and to deenergize the fourth and fifth windings when the voltage generated by the sender means is below the certain level.

4. The apparatus of claim 3 in which the predetermined angle is substantially 90°.

5. In an indicator gauge, apparatus for producing an angularly displaceable magnetic field comprising sender means for generating a voltage proportional to a condition being monitored, a power source, a first winding energized by the power source so as to produce a first magnetic field of substantially constant magnitude along the axis of the first winding, second, third, fourth, and fifth windings energized by the power source so as to produce second, third, fourth, and fifth magnetic fields along their respective axes, the angularly displaceable magnetic field being the vector sum of the first, second, third, fourth, and fifth magnetic fields, the second winding being series wound with the third winding and the fourth winding being series wound with the fifth winding, the axes of the windings substantially describing a plane in which the first, third, and fourth windings are substantially coaxial and positioned so as to cause the first magnetic field to oppose the third and fourth magnetic fields and in which the second and fifth windings are substantially coaxial and positioned so as to cause the second magnetic field to oppose the fifth magnetic field when the respective windings are energized, the axis of the first, third, and fourth windings being at a predetermined angle to the axis of the second and fifth windings, a first transistor for controlling the energization of the second and third windings in accordance with the voltage generated by the sender means, the first transistor base being fixed at a constant bias level, the first transistor collector being series connected with the second and third windings, and the first transistor emitter being supplied with the voltage generated by the sender means so as to variably energize the second and third windings when the voltage generated by the sender means is below a certain level and to deenergize the second and third windings when the voltage generated by the sender means is above the certain level, and a second transistor for controlling the energization of the fourth and fifth windings in accordance with the voltage generated by the sender means, the second transistor base being fixed at a constant bias level, the second transistor collector being series connected with the fourth and fifth windings, and the second transistor emitter being supplied with the voltage generated by the sender means so as to variably energize the fourth and fifth windings when the voltage generated by the sender means is above the certain level and to deenergize the fourth and fifth windings when the voltage generated by the sender means is below the certain level.

6. The apparatus of claim 5 in which the predetermined angle is substantially 90°.

7. In an indicator gauge, apparatus for producing an angularly displaceable magnetic field comprising sender means for generating a voltage proportional to a condition being monitored, a power source, winding support means, a first winding disposed on the support means and energized by the power source so as to produce a first magnetic field of substantially constant magnitude along the axis of the first winding, second, third, fourth, and fifth windings disposed on the support means and energized by the power source so as to produce second, third, fourth, and fifth magnetic fields along their respective axes, the angularly displaceable magnetic field being the vector sum of the first, second, third, fourth, and fifth magnetic fields, the second winding being series wound with the third winding and the fourth winding being series wound with the fifth winding, the axes of the first, second, third, fourth, and fifth windings substantially describing a plane in which the first, third, and fourth windings are substantially coaxial and positioned so as to cause the first magnetic field to oppose the third and fourth magnetic fields and in which the second and fifth windings are substantially coaxial and positioned so as to cause the second magnetic field to oppose the fifth magnetic field when the respective windings are energized, the axis of the first, third and fourth windings being at a predetermined angle to the axis of the second and fifth windings, and first and second transistors of opposite conductivity types having their respective base biases fixed at constant levels and their respective emitters supplied with the voltage generated by the sender means, the first transistor collector being series connected with the second and third windings and the second transistor collector being series connected with the fourth and fifth windings whereby the second and third windings are variably energized by the power source when the voltage generated by the sender means is below a certain level and are deenergized when the voltage generated by the sender means is above the certain level and the fourth and fifth windings are variably energized when the voltage generated by the sender means is above the certain level and are deenergized when the voltage generated by the sender means is below the certain level.

8. The apparatus of claim 7 in which the predetermined angle is substantially 90°.

9. In an indicator gauge, apparatus for producing an angularly displaceable magnetic field comprising sender means for generating a voltage proportional to a condition being monitored, a power source, winding support means, a first winding disposed on the support means and energized by the power source so as to produce a first magnetic field of substantially constant magnitude along the axis of the first winding, second, third, fourth, and fifth windings disposed on the support means and energized by the power source so as to produce second, third, fourth, and fifth magnetic fields along their respective axes, the angularly displaceable magnetic field being the vector sum of the first, second, third, fourth, and fifth magnetic fields, the second winding being series wound with the third winding and the fourth winding being series wound with the fifth winding, the axes of the first, second, third, fourth, and fifth windings substantially describing a plane in which the first, third, and fourth windings are substantially coaxial and positioned so as to cause the first magnetic field to oppose the third and fourth magnetic fields and in which the second and fifth windings are substantially coaxial and positioned so as to cause the second magnetic field to oppose the fifth magnetic field when the respective windings are energized, the axis of the first, third and fourth windings being at a predetermined angle to the axis of the second and fifth windings, and first and second transistors of opposite conductivity types, the first transistor being an NPN-transistor and the second transistor being a PNP-transistor both the NPN and the PNP-transistors having their respective base biases fixed at constant levels and their respective emitters supplied with the voltage generated by the sender means, the NPN-transistor collector being series connected with the second and third windings and the PNP-transistor collector being series connected with the fourth and fifth windings whereby the second and third windings are variably energized by the power source when the voltage generated by the sender means is below a certain level and are deenergized when the voltage generated by the sender means is above the certain level and the fourth and fifth windings are variably energized when the voltage generated by the sender means is above the certain level and are deenergized when the voltage generated by the sender means is below the certain level.

10. The apparatus of claim 9 in which the predetermined angle is substantially 90°.

11. Apparatus for monitoring a condition at a remote station comprising sender means for generating a voltage proportional to the condition being monitored; a power source; and indicator means for indicating the status of the condition being monitored at the remote station, the indicator means including winding support means, a first winding disposed on the support means and energized by the power source so as to produce a first magnetic field of substantially constant magnitude along the axes of the first winding, second, third, fourth, and fifth windings disposed on the support means and energized by the power source so as to produce second, third, fourth, and fifth magnetic fields along their respective axes, the axes of the first, second, third, fourth, and fifth windings substantially describing a plane in which the first, third, and fourth windings are substantially coaxial and positioned so as to cause the first magnetic field to oppose the third and fourth magnetic fields and in which the axes of the second and fifth windings are substantially coaxial and positioned so as to cause the second magnetic field to oppose the fifth magnetic field when the respective windings are energized, the axes of the first, third, and fourth windings being at a predetermined angle to the axes of the second and fifth windings, the vector sum of the first, second, third, fourth, and fifth magnetic fields being an angularly displaceable magnetic field, a permanent magnet armature rotatably supported centrally of the windings so as to be aligned with the angularly displaceable magnetic field, an indicator needle affixed to the armature so as to be rotatable therewith, and first and second transistors of opposite conductivity types having their respective base biases fixed at constant levels and their respective emitters supplied with the voltage generated by the sender means, the first transistor collector being series connected with the second and third windings and the second transistor collector being series connected with the fourth and fifth windings whereby the second and third windings are variably energized by the power source when the voltage generated by the sender means is below a certain level and are deenergized when the voltage generated by the sender means is above the certain level and the fourth and fifth windings are variably energized when the voltage generated by the sender means is above the certain level and are deenergized when the voltage generated by the sender means is below the certain level so as to control the angular orientation of the angularly displaceable magnetic field, the permanent magnet armature, and the indicator needle in accordance with the voltage generated by the sender means.

12. The apparatus of claim 11 in which the predetermined angle is substantially 90°.

13. The apparatus of claim 11 in which the first transistor is an NPN transistor and the second transistor is a PNP-transistor.

14. The apparatus of claim 13 in which the predetermined angle is substantially 90°.

15. In an indicator gauge, apparatus for producing an angularly displaceable magnetic field comprising sender means for generating a voltage proportional to a condition being monitored, means for producing a constant intensity magnetic field along a first axis, first and second means for producing first and second variable intensity magnetic fields along axes at a predetermined angle to the first axis, the angularly displaceable magnetic field being the vector sum of the constant intensity field and the first and second variable intensity magnetic fields, a power source for energizing the first and second means, and first and second voltage responsive switches for controlling the energization of the respective first and second means in accordance with the voltage generated by the sender means so as to vary the intensity of the first and second magnetic fields, the first voltage responsive switch variably energizing the first means when the voltage generated by the sender means is below a certain level and deenergizing the first means when the voltage generated by the sender means is above the certain level and the second voltage responsive switch variably energizing the second means when the voltage generated by the sender means is above the certain level and deenergizing the second means when the voltage generated by the sender means is below the certain level.

16. The apparatus of claim 15 in which the first voltage responsive switch is an NPN-transistor and the second voltage responsive switch is a PNP-transistor.

* * * * *